UNITED STATES PATENT OFFICE.

ARTHUR NIXON, OF MANCHESTER, ENGLAND.

MATERIAL APPLICABLE FOR VALVE-PACKING OR OTHER PURPOSES.

SPECIFICATION forming part of Letters Patent No. 674,872, dated May 28, 1901.

Application filed December 3, 1900. Serial No. 38,431. (No specimens.)

*To all whom it may concern:*

Be it known that I, ARTHUR NIXON, a subject of the Queen of Great Britain, and a resident of Manchester, in the county of Lancaster, England, have invented certain new and useful Improvements in Material Applicable for Valve-Packing or other Purposes, of which the following is a specification.

This invention relates to the manufacture of packing applicable for valves, pistons, pipe-joints, washers, and for other purposes.

It consists, essentially, of a composition comprising black sulfid of antimony, asbestos powder, and rubber dough thoroughly mixed and incorporated together and then vulcanized.

In carrying out the invention the black sulfid of antimony and asbestos are separately ground or reduced to a fine state of subdivision and are then intimately mixed together in the proper proportions. The mixing may take place in a grinding-machine, either in a dry or wet state, or in any suitable form of mixing-machine. The rubber dough is also prepared in the usual way and the mixture of the black sulfid of antimony and asbestos is incorporated therewith in the desired proportions. The following proportions have been found to give very satisfactory results, viz: black sulfid of antimony, four pounds; asbestos powder, six pounds; rubber dough, ninety pounds; total, one hundred pounds. It is to be understood that these proportions may be varied as may be found desirable for various purposes. To increase the hardness or brittleness of the material the proportion of the rubber dough may be reduced, and to render it more pliable the proportion of the asbestos or rubber dough may be increased.

The composition is molded to shape in suitable molds—such as disks, rings, plugs, bars, or other desired shape—or may be rolled or spread into sheets of any desired size and thickness and is then treated in a vulcanizing-oven in the way customary with rubber goods of this class.

What I claim as my invention, and desire to protect by Letters Patent, is—

1. A composition applicable for valve-packing and other purposes comprising black sulfid of antimony, asbestos powder, and rubber dough in suitable proportions substantially as described.

2. In a composition applicable for valve-packing and other purposes, the combination with asbestos and rubber dough, of a suitable proportion of black sulfid of antimony substantially as described.

In witness whereof I have hereunto signed my name, in the presence of two subscribing witnesses, this 22d day of November, 1900.

ARTHUR NIXON.

Witnesses:
   J. OWDEN O'BRIEN,
   HARRY BARNFATHER.